United States Patent [19]

Nakano

[11] 4,148,383
[45] Apr. 10, 1979

[54] FREEWHEEL
[76] Inventor: Takazi Nakano, 1122 Banchi, Hiokiso Nishimachi Sakai, Japan
[21] Appl. No.: 836,908
[22] Filed: Sep. 26, 1977
[30] Foreign Application Priority Data
Nov. 29, 1976 [JP] Japan .............................. 51-159903[U]
[51] Int. Cl.² .............................................. F16D 41/18
[52] U.S. Cl. ........................................ 192/64; 192/46
[58] Field of Search .............................. 192/45, 46, 64
[56] References Cited
U.S. PATENT DOCUMENTS

| 1,270,570 | 6/1918 | Van Ness | 192/45 |
| 1,361,757 | 12/1920 | Emerson | 192/64 |
| 1,362,591 | 12/1920 | Von Beaulieu | 192/64 |
| 1,429,196 | 9/1922 | Dughera | 192/64 |

FOREIGN PATENT DOCUMENTS

| 114708 | 11/1900 | Fed. Rep. of Germany | 192/64 |
| 342763 | 9/1904 | Fed. Rep. of Germany | 192/64 |
| 555154 | 3/1923 | France | 192/45 |
| 556975 | 4/1923 | France | 192/64 |
| 631443 | 9/1927 | France | 192/64 |

Primary Examiner—Allan D. Herrmann
Attorney, Agent, or Firm—Wenderoth, Lind & Ponack

[57] ABSTRACT

A freewheel to be used for the motive power transmission mechanism of vehicles, such as bicycles and motorcycles, and other machines, includes ratchet mechanism provided at one lateral side of a sprocket wheel.

8 Claims, 7 Drawing Figures

FREEWHEEL

BACKGROUND OF THE INVENTION

The present invention relates to a freewheel to be used for the motive power transmission mechanism of vehicles, such as bicycles and motorcycles, and other machines.

In the conventional freewheel of this kind, a sprocket wheel having teeth at its periphery for engagement with a chain is provided at its inner circumferential surface, with saw-toothed ratchet teeth, and on a part of the periphery of the body which is fitted in the sprocket wheel there are provided pins which are always urged to protrude by a spring so that tips of the pins are brought into contact with the ratchet teeth. Under this arrangement, when the sprocket wheel is rotated in one direction, the body is rotated together with the sprocket wheel by engagement of the pins with the ratchet teeth, and when the wheel is rotated in the other direction or when the sprocket wheel rotates at a speed higher than the r.p.m. of the body, the pins are disengaged from the ratchet teeth so that the sprocket wheel rotates independent of the body.

In the above conventional method, in order to provide pins and ratchet teeth at the outer circumferential surface of the body, the body must have a comparatively large size. On the other and, a wheel having a smaller size raises problems with regard to manufacture and strength.

SUMMARY OF THE INVENTION

With the above discussion in mind, the present invention has been designed to eliminate the defect of the conventional freewheel by placing the ratchet part on the lateral side of the wheel and to provide a freewheel which makes it possible to dispose the ratchet mechanism always at a normal position, irrespective of the size of the sprocket wheel, to standardize the parts for simplification of manufacture, and to increase the number of pins so as to make the freewheel withstand a larger torque.

The present invention is directed to a freewheel which comprises a body member having screw threads at the peripheral surface thereof and a flange provided integrally at one end thereof. Pin-receiving holes are bored parallel with the axial center of the body. Pins or balls are fitted in the pin-receiving holes in such a manner that they are always urged to protrude outwardly therefrom by a spring. A sprocket wheel has formed in one lateral side thereof a number of pin-locking tapered grooves and is fitted on the body. A tightening ring is screwed onto the body to sandwich the sprocket wheel between the flange of the body and the tightening ring so that the sprocket wheel is supported in such a manner that it is allowed to rotate freely in only one direction.

BRIEF DESCRIPTION OF THE DRAWINGS

The drawings show the construction of preferred embodiments of the present invention in which the freewheel is applied to a bicycle, and wherein.

DETAILED DESCRIPTION OF THE INVENTION

Figure 1A:
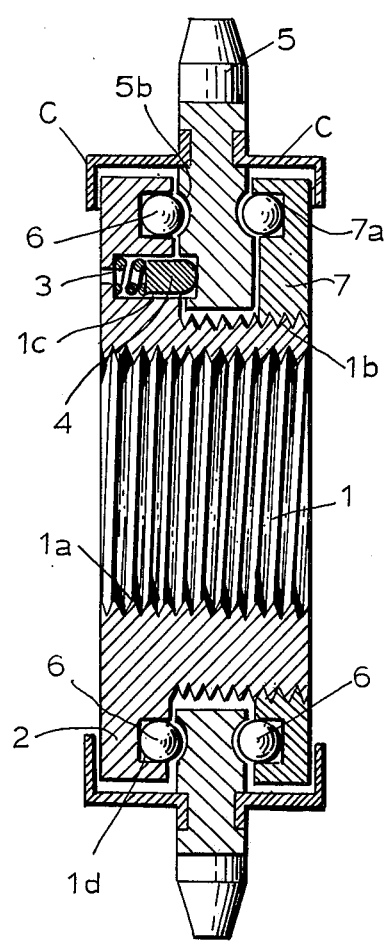
FIG. 1a, FIG. 1b and FIG. 1c are the vertical sections of different embodiments of the invention.

The present invention is described hereinafter with reference to preferred embodiments.

In the drawing, the freewheel of the invention includes body 1. Formed on the inside of the body 1 are female screw threads 1a for screw engagement with the outer circumferential surface of a hub. The body 1 has on one lateral side thereof a flange 2, the inner surface of which supports one lateral side of a sprocket wheel. The body 1 has male screw threads 1b on its outer periphery.

One the inside of the flange 2 of the body 1, there are provided at least two pin-receiving holes 1c bored to extend parallel with the axial center of the body 1. These pin receiving holes 1c are arranged at appropriate intervals. In each pin receiving hole 1c, a spring 3 and an engagement device such as a pin 4 are fitted so that the pin 4 is urged to protrude partly outwardly from the inside surface 2a of the flange 2 by the spring force of the spring 3.

The number of the above pin-receiving holes 1c is determined according to the torque applied to the sprocket wheel. Depending on the springing force of the spring 3, a steel ball may be used in place of the pin 4.

Figure 2A:
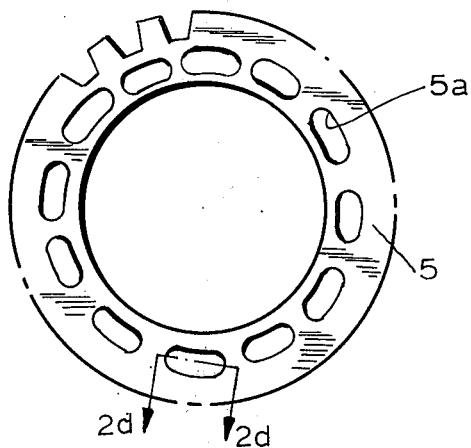
FIG. 2a, FIG. 2b, FIG. 2c and FIG. 2d are drawings parts of the freewheel according to the present invention.
Figure 2C:
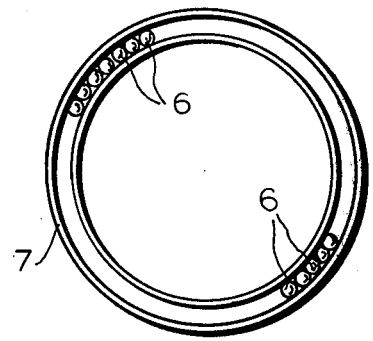
Figure 2B:
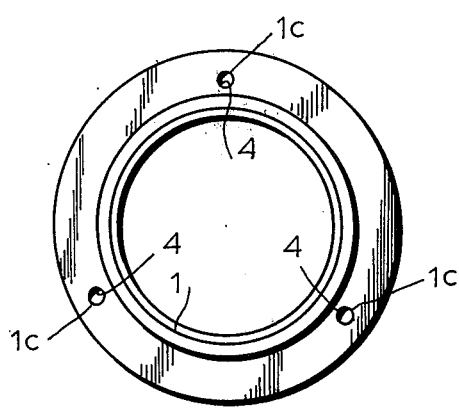
Figure 2D:
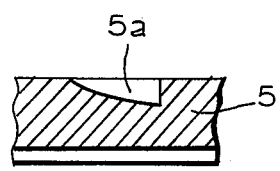

Loosely fitted to the outer circumferential surface of the body 1 is a sprocket wheel 5 having a required number of teeth, and a number of pin locking grooves 5a are provided at equal intervals on one side of the sprocket wheel 5, i.e., on the side facing the inside surface 2a of the flange 2. The distance between the pin locking grooves 5a is made to correspond to the distance between the pin-receiving holes 1c so that all or some of the pins fitted in the pin-receiving holes 1c are simultaneously locked by or separated from the pin locking grooves 5a. The pin locking grooves 5a are of an elliptical shape and are aligned in a circumferential direction on one lateral surface of the sprocket wheel, as shown in FIG. 2a. Each of the pin locking grooves 5a is formed to have a tapered depth so that the groove 5a is deep at one end thereof and gradually becomes shallow toward the other end thereof until it finally rises to the same level as the sprocket wheel surface, as shown in FIG. 2d. Because of this configuration of the grooves 5a, both the sprocket wheel 5 and the body 1 are rotated together in only one direction by the engagement between the pins 4 and pin locking grooves 5a. In the case of rotation in the opposite direction, the pins 4 slide up the tapered surface of the grooves to release the engagement between the pins and the grooves, thus forming a type of the ratchet mechanism.

Figure 1B:
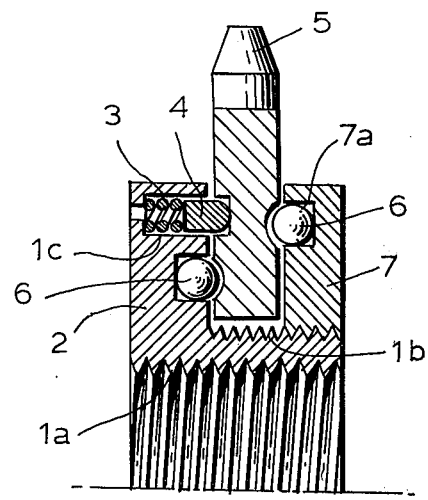
Figure 1C:
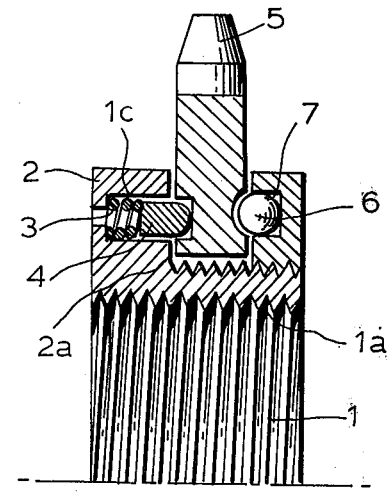

To the male screw 1b on the outer circumference of the body 1 is screwed a tightening ring. This tightening ring 7 is provided on one lateral side thereof with an annular ball-receiving groove 7a. In this ball-receiving groove 7a are placeda plurality of balls 6, and the tightening ring 7 is screwed to the male screw 1b in such a manner that ring 7 presses the balls 6 onto the adjacent lateral side of the sprocket wheel 5. Thus, the sprocket wheel 5 is rotatably supported between the tightening ring 7 and the flange 2 of the body 1. In one embodiment, the above-mentioned balls 6 are brought into tight contact with only one surface of the sprocket wheel as shown in FIG. 1c, but the balls 6 may be provided to be brought into tight contact with both surfaces of the sprocket wheel as shown in FIG. 2a and FIG. 2b. In this case, a ball-receiving groove 1d similar to the above-mentioned ball-receiving groove 7a is provided at a position radially outwardly of the pin-receiving holes 1c in the inner surface of the flange, as shown in FIG. 1a, or at a radially inwardly position of the pin-receiving holes 1c, as shown in FIG. 1b. A plurality of balls 6 are positioned in groove 1d to bring them into contact with the adjacent surface of the sprocket wheel 5. In this manner, the balls 6 are brought into contact with both lateral surfaces of the sprocket wheel to provide smooth rotation of the sprocket wheel in relation to the body and to prevent rotation problems which otherwise may be caused by a large torque. Also, the sprocket wheel is supported under pressure by balls 6 on the flange side, while it is allowed to rotate smoothly.

Moreover, annular recesses 5b may be provided on the lateral surfaces of the sprocket wheel 5 so that the balls 6 are at all times kept in contact with the same circumferential surfaces of the sprocket wheel. Furthermore, a cover C can be provided on both sides of the sprocket wheel 5 so as to cover the gap between the sprocket wheel 5 and the flange and the gap between the sprocket wheel and the tightening ring 7, thereby preventing entry of rain water, etc. into such gaps.

The present invention provides the advantages that since the ratchet mechanism is provided at one lateral side of the sprocket wheel, it becomes possible to dispose the ratchet mechanism at all time at a regular position, without regard to the size of the wheel, whereby manufacturing is made easy and the number of pins provided can easily be increased to withstand a larger torque.

What is claimed is:

1. A freewheel assembly comprising:
   a body member having axially extending internal threads for attachment to a hub, said body member including a first axial portion having a threaded external peripheral surface and a second axial portion having an integral radially outwardly extending flange, said flange having a radially extending axially inner surface;
   a plurality of axially extending holes bored in said flange and opening on said inner surface;
   each said hole having positioned therein an engagement device and means for urging said engagement device outwardly of said hole;
   a sprocket wheel mounted about said threaded external peripheral surface of said body member, said sprocket wheel having first and second radially extending lateral surfaces, said first lateral surface facing said inner surface of said flange;
   said first lateral surface of said sprocket wheel having formed therein a plurality of circumferentially spaced locking grooves, each said locking groove having a depth tapering circumferentially from a first deep end thereof toward a second end thereof merging into said first lateral surface of said sprocket wheel;
   a tightening ring screwed onto said threaded external peripheral surface of said body member, said tightening ring having a radially extending inner surface facing said second lateral surface of said sprocket wheel, said inner surface of said tightening ring having formed therein a circumferentially extending annular groove;
   a plurality of balls positioned within said annular groove and contacting said second lateral surface of said sprocket wheel; and
   said tightening ring forcing said balls toward said sprocket wheel and forcing said sprocket wheel toward said flange and against said engagement devices and the force of said urging means, such that when one of said sprocket wheel and said body member is rotated in a first direction, said engagement devices will be locked against said first ends of said locking grooves and said sprocket wheel and said body member will rotate together in said first direction, and such that when one of said sprocket wheel and said body member is rotated in a second direction, said engagement devices will ride over said second ends of said locking grooves and will not lock in said locking grooves and the other of sid sprocket wheel and said body member will not be rotated.

2. An assembly as claimed in claim 1, wherein said second lateral surface of said sprocket wheel has formed therein a circumferentially extending annular recess, said balls contacting said annular recess.

3. An assembly as claimed in claim 1, wherein said inner surface of said flange has formed therein a further circumferentially extending annular groove, and further comprising a further plurality of balls positioned within said further annular groove in said flange and contacting said first lateral surface of said sprocket wheel.

4. An assembly as claimed in claim 3, wherein said first lateral surface of said sprocket wheel has formed therein a further circumferentially extending annular recess, said further plurality of balls contacting said further annular recess.

5. An assembly as claimed in claim 3, wherein said further annular groove is positioned radially outwardly of said holes.

6. An assembly as claimed in claim 3, wherein said further annular groove is positioned radially inwardly of said holes.

7. An assembly as claimed in claim 3, wherein a first radial gap is provided between said inner surface of said flange and said first lateral surface of said sprocket wheel, and a second radial gap is provided between said second lateral surface of said sprocket wheel and said inner surface of said tightening ring, and further comprising cover means attached to said sprocket wheel and extending axially across said first and second radial gaps for preventing entry of foreign substances into said first and second radial gaps.

8. An assembly as claimed in claim 1, wherein said engagement devices comprise pins.

* * * * *